United States Patent Office 3,300,820
Patented Jan. 31, 1967

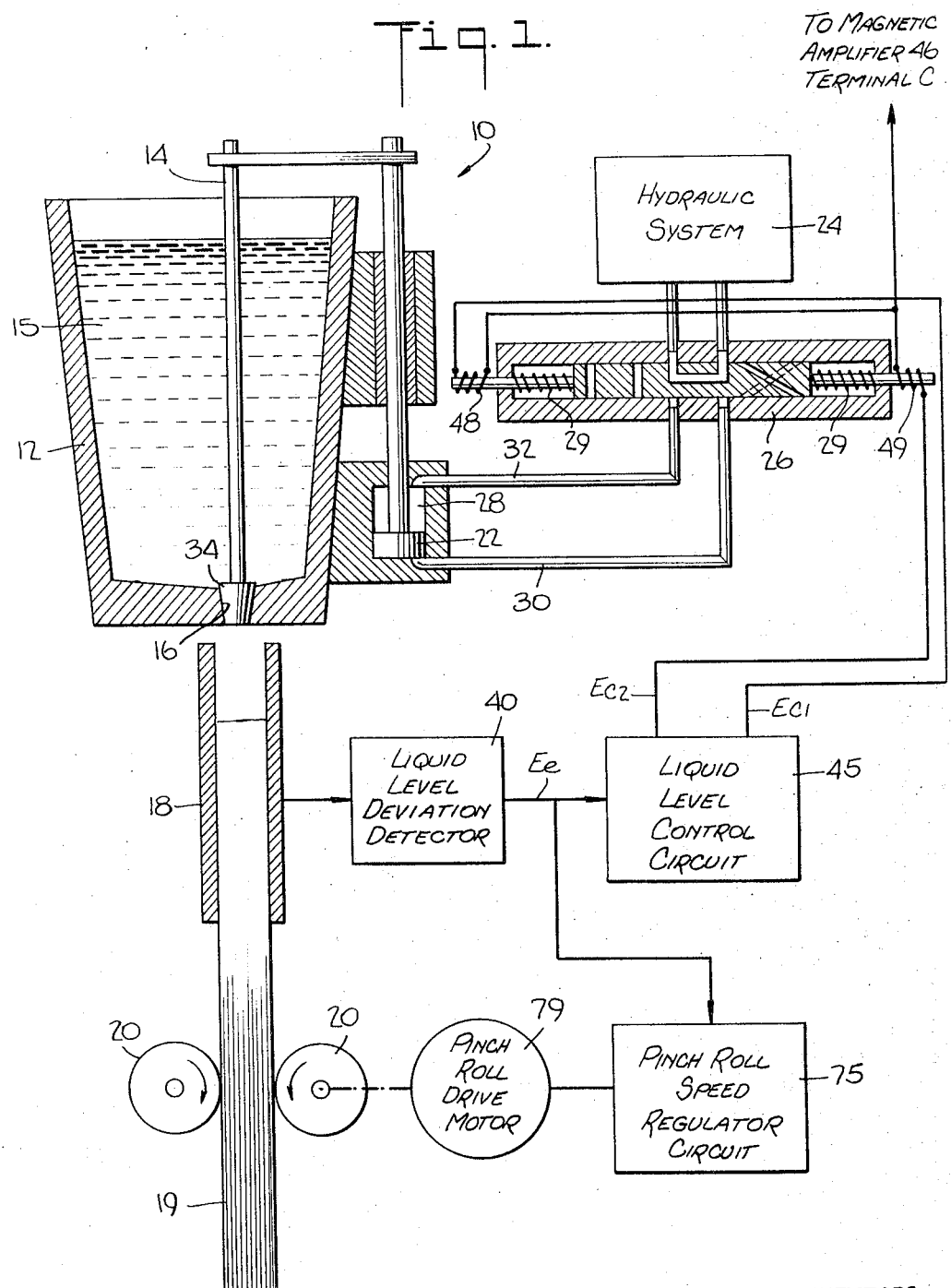

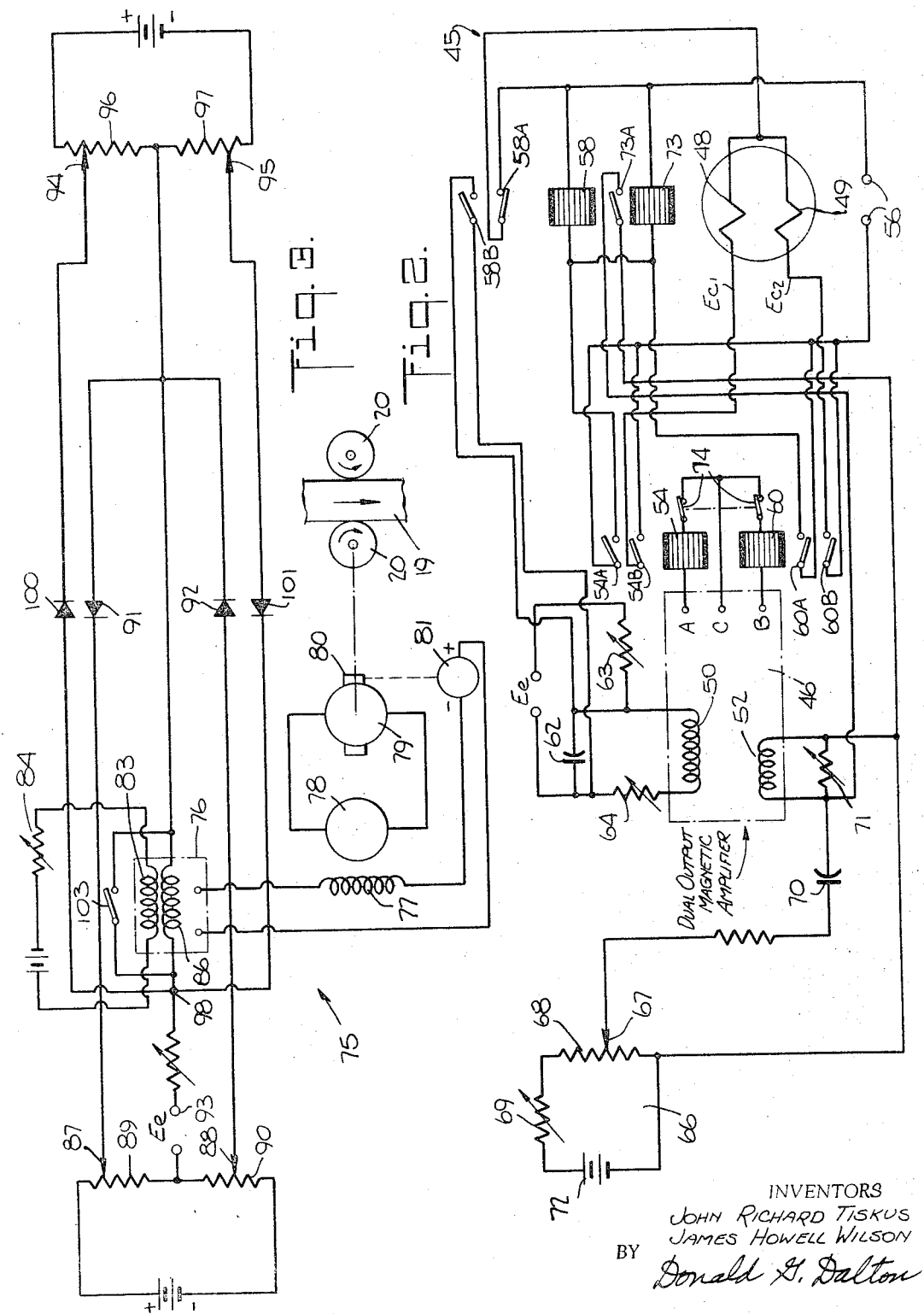

3,300,820
SYSTEM FOR CONTROLLING THE LIQUID LEVEL IN A CONTINUOUS-CASTING MOLD OR THE LIKE
John Richard Tiskus, Monroeville Borough, and James Howell Wilson, Franklin Township, Westmoreland County, Pa., assignors to United States Steel Corporation, a corporation of Delaware
Filed Mar. 23, 1964, Ser. No. 353,696
12 Claims. (Cl. 22—57.2)

This invention relates in general to a system for controlling the level of the molten metal in the continuous-casting mold and, more particularly, to a system for using an error signal which indicates the deviance from a desired liquid level to control the rate at which liquid is supplied to the mold and the rate at which casting is withdrawn from the mold.

This invention supplies an automatic link between (1) a known device for controlling the rate at which liquid flows into a continuous-casting mold and (2) a known technique for developing an error signal which indicates the amount and direction by which the liquid level in the mold deviates from a desired level. The link supplied by this invention completes a servo loop to automatically control the liquid level in the mold. This invention also supplies an automatic link between this error signal and the known control over pinch roll speed so as to provide a secondary servo loop for exerting additional control over the liquid level in the mold.

In the continuous casting of metal it is important that the metal level in the mold remain at a pre-selected level in order to insure maximum casting production within the cooling capacity of the mold. Techniques are known for an operator control over the rate at which liquid is fed to the mold. One such technique is described in Patent No. 2,832,110, issued to Carleton on April 29, 1958. The disadvantage of operator control techniques is that such techniques can never be as sensitive as an automatic control and are subject to the vagaries of operator fatigue and operator observational error.

Accordingly, it is a major purpose of this invention to provide a system for automatically controlling the liquid level in a continuous casting mold.

Since devices for controlling the rate at which liquid flows into the mold and for indicating the level of liquid in the mold are already known, it is a further purpose of this invention to provide an automatic control system which will operate with presently known control and indicating devices.

It is a more specific object of this invention to supply a control over the liquid level in a continuous-casting mold by controlling the rate at which liquid is supplied to the mold in response to a signal indicating the extent and direction by which the liquid level in the mold deviates from a pre-selected level.

It is a further particular object of this invention to control the liquid level in the mold by affecting the rate at which the pinch rolls withdraw casting from the mold as a partial function of a signal that indicates the extent and direction that the liquid level in the mold deviates from a pre-selected level.

In brief, the preferred embodiment of this invention employs a D.C. signal which is ultimately developed from a series of thermocouples imbedded in the walls of the mold. The polarity of the D.C. signal indicates whether or not the liquid level in the mold is above or below a desired pre-selected level and the magnitude of the D.C. signal indicates the extent by which the liquid level in the mold deviates from the pre-selected level. This D.C. signal is called the error signal herein.

The polarity of the error signal is used to force the output state of a dual output magnetic amplifier into either state A or state B. These separate outputs of the magnetic amplifier are connected to separate relays whose contacts, in turn, are connected respectively to the hydraulic valve solenoids that control the movement of the stopper rod in the ladle. Thus if a positive error signal is used to indicate too high a level in the mold, the magnetic amplifier is switched to the state that turns on the relay that in turn energizes the "down" position of the solenoid controlled hydraulic valve. This initiates a hydraulic closing of the stopper rod so as to decrease the rate at which liquid flows into the mold.

When the liquid level is below the pre-selected level, an error signal of the opposite polarity is developed which then switches the magnetic amplifier to energize a second relay. This second relay in turn switches the solenoid so as to direct fluid into the hydraulic system that controls the stopper rod in such a direction as to lift up the stopper rod and therefore increase the flow of molten metal into the mold.

The system also includes a technique for detecting the rate at which the liquid level in the mold is changing and for developing a D.C. signal whose magnitude and polarity is a function of the rate of change. This rate of change signal is fed to a second control winding in the dual output magnetic amplifier. This rate of change signal has a magnitude such that it will override the deviation error signal whenever there are rapid changes in the level of the liquid in the mold. The control winding is so arranged that a rapid increase in the liquid level in the mold will switch the magnetic amplifier into the state which tends to close the stopper rod and thus decrease the rate at which a liquid is added to the mold. Thus this rate of change signal tends to damp the effect of the deviation error signal so as to avoid overshooting.

By means of a time delay relay, the error signal and the rate of change signal are temporarily shorted out about one-half second after the magnetic amplifier is switched into either output state. Thus the correction signal to the solenoid controlled hydraulic valve is intermitten, thereby minimizing the problem of overshoot and hunting.

Other objects and purposes of this invention will become apparent from the following detailed description and the accompanying drawings, in which:

FIG. 1 is a mechanical schematic and block diagram of the complete molding system incorporating this invention;

FIG. 2 is a schematic diagram of the circuitry that provides the link between the error signal $E_e$ and the solenoid operated valve which in turn controls the stopper rod position; and FIG. 3 is a circuit diagram of the link between the error signal $E_e$ and the motor generator set which controls the pinch roll speed.

FIG. 1 illustrates the complete liquid level control system 10 of this invention. Many of the major elements of the system are known to the art and will only be shown in the highly schematic or block form illustrated in FIG. 1. In particular, there is illustrated a standard bottom pour ladle 12 which incorporates a standard stopper rod 14. The vertical position of the stopper rod 14 determines the rate of flow of molten metal 15 from the bottom opening 16 of the ladle 12. Directly beneath the opening 16 of the ladle 12 there is positioned a continuous casting mold 18. As molten metal descends through the mold 18, it is cooled to form an ingot 19 which is pulled out of the bottom of the mold 18 by pinch rolls 20. It is a major purpose of this invention to maintain the liquid in the mold 18 at a pre-determined level which will result in the maximum production for the particular mold 18 and the particular cooling rate available through the mold 18. Experience also shows that variations in the liquid level have a major effect on quality and uniformity of the product.

The stopper rod 14 is lifted or lowered by means of hydraulic pressure supplied to either side of a piston head 22. A standard hydraulic system 24 supplies hydraulic pressure to either side of the piston head 22 through a solenoid controlled hydraulic valve 26. The valve 26 is a three position spring loaded valve which is controlled by two solenoids 48 and 49. When neither solenoid 48 nor 49 is energized, the springs 29 cause the valve 26 to completely block communication between the chamber 28 around the piston head 22 and the hydraulic system 24. This unenergized or neutral valve 26 position is shown in FIG. 1. When the solenoid 48 is energized, the valve 26 will admit pressure from the hydraulic system 24 to the line 30 so that pressure will be supplied to the bottom of the piston head 22 causing the stopper rod 14 to be pulled upwards and thus increasing the rate of pour from the ladle 12.

When the solenoid 49 is energized, the valve 26 will be switched so that pressure from the hydraulic system 24 will be put in communication with the line 32 and the stopper rod 14 will be pulled down thereby decreasing the rate of pour from the ladle 12.

During normal operation, the stopper rod 14 will never be entirely closed and there will always be flow from the ladle 12. An ingot 19 is at all times being fed out of the bottom of the mold 18 so that liquid must be continuously supplied to maintain any given level in the mold 18. The head portion 34 of the stopper rod 14 is designed to mesh with the hole 16 so that a variable control over the rate of flow from the opening 16 may be obtained. The valve 26 is controlled in such a fashion that liquid under pressure is supplied through either the line 30 or the line 32 for only relatively short periods of time (half a second at a time, for example) so that the stopper rod 14 is only moved a relatively short distance before the valve 26 switches to its neutral position and blocks all pressure to the piston chamber 28. When the valve 26 is switched to its neutral position, the fluid on both sides of the piston head 22, in the chamber 28, holds the stopper rod 14 at the position to which it was last moved.

One example of the hydraulic system 24 with which this invention may be employed is described in the patent to Carleton, No. 2,832,110, issued on April 29, 1958. It should be noted that the valve 26 is normally considered a part of the hydraulic system 24 but for the schematic purposes of this disclosure is separately illustrated.

A liquid level deviation detector 40 is included in this system 10 to provide a D.C. error signal $E_e$ which indicates the direction and extent of deviation of the liquid in the mold 18 from the pre-determined desired level. The error signal $E_e$ is a D.C. signal which has the characteristic that its polarity indicates whether the liquid level is above or below the preselected desired level. The absolute magnitude of the error signal $E_e$ indicates the extent by which the liquid level deviates from the pre-selected desired level. One example of a liquid level deviation detector which provides a signal $E_e$ having these characteristics is described in United States Letters Patent No. 3,204,460, issued September 7, 1965, on the co-pending application, Serial No. 216,400, filed by James A. Milnes, on August 13, 1962. The error signal $E_e$ in FIG. 4 of that disclosure has the precise characteristics just described.

The error signal $E_e$ is fed to a liquid level control circuit 45, which circuit 45 responds to the error signal $E_e$ in order to provide a control signal that in turn determintes the position of the hydraulic valve 26 and thereby adjusts the stopper rod 14. In this fashion, a servo loop is obtained by which the stopper rod 14 is adjusted as a function of the liquid level in the mold 18.

The liquid level control circuit 45 that is employed in this invention is illustrated in schematic detail in FIG. 2. The error signal $E_e$ cannot simply be amplified in order to control the valve 26, since that simple a system would produce serious overshooting and hunting in the control of the liquid level in the mold 18. The control circuit 45 must anticipate the changes in liquid level in the mold 18 by also being responsive to the rate of change of liquid level and modify the control signal $E_c$ accordingly. Furthermore, the loop response time is such that it is desirable for the control signal $E_{c1}+E_{c2}$ to be intermittent. The intermittent control signal causes stopper rod 14 changes to be made in small steps, thus permitting sufficient time to elapse between steps so that the effect of the change in pour rate will be reflected in the error signal $E_e$.

The control signal has an intermittent $E_{c1}$ component that energizes the solenoid 48 to cause an increase in liquid flow rate and an intermittent $E_{c2}$ component that energizes the solenoid 49 to cause a decrease in liquid flow rate. The control circuit 45 is designed so that the $E_{c1}$ and $E_{c2}$ components cannot be on simultaneously, though both may be off at the same time.

The error signal $E_e$ is also fed to a pinch roll speed regulator circuit 75 in order to provide a control over the withdrawal rate of the ingot 19. Under certain conditions, it is desirable to supplement the stopper rod 14 control over liquid level in the mold with a liquid level control that proceeds from regulating the withdrawal rate of metal from the mold 18. It is normally desired to add the pinch roll control to the stopper rod control only after the error signal $E_e$ has exceeded a certain minimum magnitude in either direction. Means are provided in the regulator circuit 75 to make the circuit non-responsive to $E_e$ error signals smaller than a pre-determined magnitude. It is also normally undesirable to regulate the pinch rolls 20 so extensively that the withdrawal rates become very much less or very much more than the optimum withdrawal rate. Accordingly, the circuit 75 also contains a means for setting upper and lower limits to the response of the regulator circuit 75 to the error signal $E_e$.

There are times when it may be desirable to employ the pinch roll speed regulator circuit 75 to control liquid level in the mold 18 without employing the stopper rod control circuit 45. For example, when a tundish is used to feed molten metal to the mold 18, the stopper rod 14 control might be cut out and reliance had primarily on the pinch roll speed regulator control 75.

FIG. 2 illustrates, in electrical schematic form, a liquid level control circuit 45 which responds to the error signal $E_e$ to produce the desired control signal $E_{c1}+E_{c2}$. The liquid level control circuit 45 employs a dual-output magnetic amplifier 46 to control the excitation of the solenoids 48 and 49.

In the bi-stable magnetic amplifier 46, two input windings 50 and 52 are employed so that whatever signal is developed across winding 50 is summed with whatever signal is developed across winding 52 to determine whether output A or output B or neither output is turned on. The logic of this magnetic amplifier 46 is such that both outputs A and B cannot be on at the same time but both outputs can be off at the same time. The operation of this circuit can most easily be understood by starting at the back end first and comprehending how the output of the magnetic amplifier 46 affects the solenoids 48 and 49.

When the magnetic amplifier 46 is in state A, the relay 54 is energized thereby closing the normally open relay contacts 54A and 54B. The closing of contact 54B completes a circuit from the line 56, the now closed contact 54B, the solenoid 48 and the normally closed contact 58A back to the line 56. Thus the throwing of the magnetic amplifier 46 into state A causes an increase in the rate of molten metal flow into the mold because of the energization of solenoid 48. At the same time, the closing of the contact 54A energizes the time delay relay 58. The time delay relay 58 is set to operate approximately ½ second after it has been energized so that when ½ second after the contact 54A has closed, the time delay relay contact 58A opens thus breaking the circuit to the solenoid 48. In this fashion, the stopper rod 14 is lifted only by the amount that would be determined by ½ second flow of fluid from the hydraulic system 24. Thus only a small step change is made in the pour rate of molten metal 15 from the ladle 12.

If the magnetic amplifier 46 is in state B, then the relay 60 is energized thereby closing contacts 60A and 60B. The closing of contact 60B energizes the solenoid 49 thereby lowering the stopper rod 14 and decreasing the flow of molten metal 15. The simultaneous closing of contact 60A energizes the time delay relay 58 and thereby causes the contact 58A to open in ½ second which then de-energizes the solenoid 49. With the solenoid 49 de-energized, the entire system 10 continues to function with a metal flow rate into the mold 18 that has been decreased to an extent determined by the amount which the stopper rod 14 descends in ½ second of hydraulic system 24 operation on the piston 22.

When an error signal $E_e$ exists, it charges the capacitor 62 at a rate which is controlled by the setting of the variable resistor 63. Once the variable resistor 63 has been set, the rate of charge of the capacitor 62 is then strictly a function of the magnitude of the error signal $E_e$. The polarity of charge of the capacitor 62 is a function of the polarity of the error signal $E_e$. The capacitor 62 is connected, in series with the variable resistor 64, across the control winding 50 of the dual output magnetic amplifier 46. When the voltage across the capacitor 62 reaches a pre-selected value (the value being governed by the setting of the variable resistor 64) it produces a signal across the control winding 50 which causes the magnetic amplifier 46 to provide an electrical output at either A or at B, depending upon the polarity of the charge across the capacitor 62. Thus, either the relay 54 or the relay 60 is operated by the magnetic amplifier 46 depending entirely upon the polarity of $E_e$.

As has been described previously, the excitation of either relay 54 or relay 60 will excite the coil of the time delay relay 58. The time delay relay 58 can be adjusted manually to operate over a range of time periods; the time period selected in the embodiment illustrated was approximately ½ second. When ½ second has elapsed, not only does the contact 58A open to immediately de-energize whichever of the two solenoids 48 or 49 were energized but in addition the contact 58B closes to discharge the capacitor 62. By thus discharging the capacitor 62, the signal across the control winding 50 is eliminated, the dual output magnetic amplifier 46 ceases to have an output and the cycle may be started all over. As long as the error signal $E_e$ persists, the capacitor 62 will continue to be charged to turn on the appropriate relay 54 or 60 to cause the appropriate ½ second excitation of the solenoid controlled hydraulic valve 26. The valve 26, in turn, will cause the pour rate of molten metal 15 from the ladle 12 to vary in a direction tending to decrease the magnitude of the error signal $E_e$.

Thus the frequency of pulsing through control winding 50 is proportional to the error signal $E_e$, and for a given $E_e$, the frequency of pulsing can be adjusted by the setting of the variable resistor 63 which then sets the charging rate of the capacitor 62.

In order to avoid overshooting the mark when employing the control circuitry just described in connection with the response of the magnetic amplifier 46 to the error signal $E_e$, it is desirable to further regulate the pouring rate in accordance with the rate of change of the liquid level in the mold 18. If the liquid level, for example, is below the pre-selected level but is increasing at a rapid rate, it is desirable to decrease rather than increase the pour rate to prevent overshooting and to obtain accurate control and rapid tracking of the correction with the error. The circuitry connected with the control winding 52 is employed to achieve this purpose of overriding the control dictated by the error signal $E_e$ when the rate of change of the liquid level is sufficiently rapid and is in a direction tending to decrease the error signal $E_e$.

A potentiometer 66 arrangement is employed in which a slider arm 67 is moved along a resistor 68 in such a fashion that the position of the slider arm 67 along the resistor 68 corresponds to the location of the liquid level in the mold. This may be achieved by having the slider arm 67 controlled in the same fashion as is the slider arm 67 controlled in the same fashion as is the slider arm "74" in FIG. 4 of the co-pending Milnes application, Serial No. 216,400, filed on August 13, 1962. If the slider arm 67 is stationary, a voltage is developed across the capacitor 70 which is equal and opposite to the voltage on the slider arm 67 so that no current flows through the variable resistor 71. However, as long as the slider arm 67 is moving, a current will flow through the circuit that includes the variable resistor 71 in order to charge the capacitor 70. The current flowing through the resistor 71 develops a signal across the control winding 52, which signal is summed with the signal across the control winding 50. The various parameters in this portion of the circuit (such as the magnitude of the battery 72, the size of the capacitor 70, the magnitude of the variable resistors 69 and 71 as well as the number of turns on the control winding 52) can be adjusted or selected so that the signal across the winding 52 will dominate the signal across the winding 50 and will be the controlling signal as long as there is an appreciable rate of change of the slider arm 67. Thus, for example, if the liquid level is below that desired and the level is rising rapidly, the signal developed across the control winding 52 will oppose that across the control winding 50 so as to cause the dual output amplifier 46 to be switched to state B instead of state A, thereby reducing rather than increasing the pour rate. If, however, the rate of change of liquid level is zero, or very small, then the signal across the winding 52 will be minor compared with the signal across the winding 50 and thus the state of the dual output amplifier 46 will be determined solely by the polarity of the error signal $E_e$.

The time delay relay 73 performs the same function for the circuit associated with the control winding 52 as does the time delay relay 58 for the control element 50. When either the relays 54 or 60 are energized, the time delay relay 73 becomes energized by the closing of either contact 54B or 60A. The time delay relay 73 is preset to have its contact 73A closed a predetermined period of time after it is energized, which in this embodiment may be in the order of magnitude of ½ second. Thus ½ second after a change in stopper rod 14 position has been initiated, the relay contact 73A will close and short out the variable resistors 71 thereby dropping the signal on the control coil 52 to zero and turning off whichever state the dual output amplifier 46 may have been in.

It should be remembered that when one of the states (that is, state A or state B) is turned off in this dual output amplifier 46, that the other state is not thereby automatically turned on and thus the turning off of one of the states simply means that there is no output at all and thus no energization for either the relay 54 or for the relay 60 which in turn will mean that the stopper rod 14 will be held in whatever position it was last moved to.

A double pole switch 74, normally closed, may be opened manually when it is desired to cut out the control circuit 45. This may be the case when level control is to be effected solely by control circuit 75.

FIG. 3 is an electrical schematic for the pinch roll speed regulator circuit 75. This circuit employs a proportional magnetic amplifier 76 to vary the current through the field winding 77 of an electrical generator 78. The output of the generator 78 operates a variable speed electrical motor 79 having a shaft 80 which drives the pinch rolls 20. The tachometer generator 81 shown is, as is conventional, driven from the shaft 80 of the motor 79 to provide an electrical output to the field 77 of the generator 78 that is proportional to the shaft speed of the motor 79.

The output of the magnetic amplifier 76 has a polarity and a magnitude that is related to the polarity and magnitude of the error signal $E_e$ so that the pinch roll 20 speed and thus the ingot 19 withdrawal rate is controlled in partial response to the polarity and magnitude of the error signal $E_e$.

When the error signal $E_e$ is zero or substantially zero, it is, of course, required that the pinch rolls 20 run at a pre-determined "normal" rate. This normal rate is set by means of the bias signal established across the input winding 83. This bias may be manually set by means of the variable resistor 84 so that the operator may select the desired ingot withdrawal rate for the situation when the liquid in the mold is at the pre-determined desired level.

The polarity and magnitude of the error signal $E_e$ will develop a control signal across the input winding 86 that will modify the output in a direction and to an extent tending to modify the ingot withdrawal rate so as to maintain the desired liquid level in the mold 18. However, since the normal withdrawal rate is the optimum rate for the efficient operation of the entire system, it is desirable that this modification of the withdrawal rate not occur unless the deviation of the liquid level from its desired level is appreciable. It is desirable that the control over the liquid flow rate from the ladle 12, as described in connection with FIG. 2, be the primary control over the liquid level in the mold 18.

Accordingly, it is desirable to provide a deadband in the operation of FIG. 3 so that no control action over the ingot withdrawal rate takes place unless the error signal $E_e$ reaches a pre-selected magnitude of either polarity. The range of the deadband is determined by the setting of the slider arms 87 and 88 along the resistors 89 and 90. The diode 92 makes sure that the negative voltage at the slider arm 88 does not cause current to flow through the input control winding 86; while the diode 91 makes sure that the positive voltage at the slider arm 87 does not result in current flowing through the control winding 86. When the voltage at the terminal 93 becomes more negative than the voltage established by the slider arm 88, then and only then will current flow through the diode 92 and the winding 86 thereby modify the ingot 19 withdrawal rate. When the voltage at the terminal 93 becomes more positive than the voltage at the slider arm 87, then, and only then, will current flow through input control winding 86 and the diode 92 to cause a modification of the ingot withdrawal rate. As may then be readily seen, the direction of current flow through the winding 86 will depend upon the polarity of the signal at the terminal 93. Thus the polarity of the error signal $E_e$ will determine whether or not the modification of the ingot withdrawal rate will be to increase or decrease withdrawal rate.

The pinch roll speed regulator circuit 75 also provides a means for limiting the minimum and maximum pinch roll 20 speed in response to the error signal $E_e$. This is achieved by the manual setting of the slider arms 94 and 95 along the resistors 96 and 97. When the voltage at the juncture 98 tends to exceed the positive voltage established at the slider arm 94, then the diode 100 will conduct to establish a voltage at the terminal 98 which is substantially equal to the voltage at the slider arm 94. Similarly, when the voltage at the juncture 98 becomes more negative than the voltage established by the setting of the slider arm 95, then the diode 101 will conduct to establish a maximum negative voltage at the juncture 98 that is substantially equal to the negative voltage at the slider arm 95.

The switch 103 is simply provided so as to permit shorting out the control winding 86 so that the operator can eliminate the ingot 19 withdrawal rate control if desired and can rely entirely upon the pour rate control.

As used in the claims herein, the term "dual-output magnetic amplifier" will be understood to mean a magnetic amplifier which has three stable states, one stable state being a state in which it provides no output, a second stable state being a state in which it provides a first output, and a third stable state being a state in which it provides a second output. It shall also be understood that such an amplifier herein is constructed so that it can only be in one of these three states at a time, so that the first output and the second output cannot both be simultaneously provided. Thus, this dual-output magnetic amplifier has three stable states including its "off" state.

The embodiment described in detail herein is an embodiment of the invention that is preferred for use with presently designed circuitry and controls. It would be obvious to one skilled in this art to make modifications to adapt the system to different equipment or to meet different performance requirements. It is intended in the claims to cover all the variations that may be made without departing from the spirit and scope of the invention.

What is claimed is:

1. A system for controlling the liquid level in a continuous casting mold comprising:
   a liquid level deviation detector circuit coupled to said mold to provide an error signal, said error signal having the characteristic that its polarity indicates the direction of liquid level deviation from a pre-determined level and its magnitude indicates the extent of deviation of the liquid level from said pre-determined level,
   a liquid level control circuit responsive to said error signal to provide a first intermittent control signal when said error signal is of one polarity, a second intermittent control signal when said error signal is of the other polarity,
   pour rate regulating means responsive to said intermittent control signals to increase the pour rate in response to said first correction signal and to decrease the pour rate in response to said second correction signal,
   pinch roll drive means for withdrawing a casting from said mold, and
   a pinch roll speed regulator circuit responsive to said error signal to provide a third control signal for controlling the rate at which said pinch roll drive means withdraws said casting from said mold, said third control signal having the characteristics (1) that it remains unchanged in response to an error signal of either polarity that is less than a first pre-set magnitude, (2) that it changes linearly in amplitude in response to the magnitude of an error signal of either polarity where the error signal is greater than said first pre-set magnitude and less than a second pre-set magnitude, and (3) that it will cease to further change in response to an error signal having a magnitude that is greater than said second pre-set magnitude.

2. In a system for controlling the liquid level of a continuous casting mold, said system including means to provide an error signal having the characteristic that its polarity indicates the direction of liquid level deviation from a pre-determined level and its magnitude indicates the extent of deviation of liquid level from said pre-determined level, said system also including a pinch roll drive for withdrawing an ingot from said mold, the improvement comprising:

a pinch roll speed regulator circuit responsive to said error signal to provide a control signal over said pinch roll drive thereby modifying the withdrawal rate of said ingot, said control signal being a function of the magnitude and polarity of said error signal, said pinch roll speed regulator circuit including:

means for providing a pre-determined magnitude for said control signal when said error signal is zero, Modifying means for modifying the magnitude of said control signal in response to the polarity and magnitude of said error signal whereby said control signal is decreased in response to an error signal of one polarity and increased in response to an error signal of the other polarity, the magnitude of said increase or said decrease being proportional to the magnitude of said error signal, means for providing a dead band in the response of said control signal to said error signal whereby said modifying means will be disenabled when said error signal has less than a pre-set magnitude in either direction, and means for providing a maximum modification in said control signal whereby an error signal greater than a pre-set magnitude in either direction will cease to further modify said control signal.

3. In a system for controlling the liquid level of a continuous casting mold, said system including means to provide an error signal having the characteristic that its polarity indicates the direction of liquid level deviation from a predetermined level and its magnitude indicates the extent of deviation of liquid level from said pre-determined level, said system also including a pour rate regulating means for varying the rate of pour of molten liquid into said mold, said pour rate regulating means including a normally closed three position valve having a closed position, a first open position to increase pour rate, and a second open position to decrease pour rate, said system also including a pinch roll drive for withdrawing an ingot from said mold, the improvement comprising:

A. a liquid level control circuit responsive to said error signal to provide a first intermittent control signal when said error signal is of one polarity and a second intermittent control signal when said error signal is of the other polarity, said first intermittent control signal being coupled to said valve to switch said valve into said first position, and said second intermittent control signal being coupled to said valve to switch said valve into said second position, and B. a pinch roll speed regulator circuit responsive to said error signal to provide a third control signal over said pinch roll drive thereby modifying the withdrawal rate of said ingot, said third control signal being a function of the magnitude and polarity of said error signal, said pinch roll speed regulator circuit including:

(1) means for providing a pre-determined magnitude for said third control signal when said error signal is zero, (2) means for modifying the magnitude of said third control signal in response to the polarity and magnitude of said error signal whereby said third control signal is decreased in response to an error signal of one polarity and increased in response to an error signal of the other polarity, the magnitude of said increase or said decrease being proportional to the magnitude of said error signal, (3) means for providing a dead band in the response of said third control signal to said error signal whereby said modifying means will be disenabled when said error signal has less than a pre-set magnitude in either direction, and (4) means for providing a maximum modification in said third control signal whereby an error signal greater than a pre-set magnitude in either direction will cease to further modify said third control signal.

4. In a system for controlling the liquid level in a continuous casting mold, a liquid level control circuit responsive to an error signal, said error signal having the characteristic that its polarity indicates the direction of liquid level deviation from a pre-determined level and its magnitude indicates the extent of liquid level deviation from said pre-determined level, to provide a first intermittent control signal in response to an error signal of one polarity and a second intermittent control signal in response to an error signal of the other polarity, said liquid level control circuit comprising:

a normally "off" dual-output magnetic amplifier having a first output state, a second output state, and an input control winding, said control winding being coupled to said error signal, a capacitor across said control winding, whereby an error signal of a first polarity will force said magnetic amplifier into said first output state and an error signal of the opposite polarity will force said magnetic amplifier into said second output state, first responsive means coupled to said first output state of said magnetic amplifier to provide said first control signal when energized by said first output state, second responsive means coupled to said second output state to provide said second control signal when energized by said second output state, and timing means coupled to said first responsive means and to said second responsive means to terminate said control signals after a predetermined time, said timing means also being coupled to said capacitor to short out said capacitor after said predetermined time.

5. In a system for controlling the liquid level of a continuous casting mold, said system including a means to provide an error signal having the characteristic that its polarity indicates the direction of liquid level deviation from a predetermined level and its magnitude indicates the extent of deviation of liquid level from said predetermined level, said system also including a pour rate regulating means for varying the rate of pour of molten liquid into said mold, said pour rate regulating means including a normally closed three position valve having a closed position, a first open position to increase pour rate, and a second open position to decrease pour rate, a liquid level control circuit comprising:

first means responsive to the polarity of said error signal to provide a first intermittent control signal when said error signal is of one polarity and a second intermittent control signal when said error signal is of the other polarity, said first intermittent control signal being coupled to said valve to switch said valve into said first position and said second intermittent control signal being coupled to said valve to switch said valve into said second position, and second means responsive to the rate of change of said error signal to override said first and said second intermittent control signals when said rate of change is appreciable to provide a third intermittent control signal in response to an error signal change indicating a rising liquid level and to provide a fourth intermittent control signal in response to an error signal change indicating a falling liquid level, said third intermittent control signal being coupled to said valve to switch said valve into said second position and said fourth intermittent control signal being coupled to said valve to switch said valve into said first position.

6. A system for controlling the liquid level in a continuous casting mold comprising:

a liquid level deviation detector circuit coupled to said mold to provide an error signal, said error signal having the characteristic that its polarity indicates the direction of liquid level deviation from a pre-determined level and its magnitude indicates the extent of deviation of the liquid level from said pre-determined level, a liquid level control circuit coupled to said error signal to provide appropriate control signals, said control circuit comprising (1) means responsive to the polarity of said error signal to provide a first intermittent control signal in response to an error signal having a polarity indicating a liquid level below said pre-determined level and to provide a second intermittent control signal in response to an error signal having a polarity indicating a liquid level above said pre-determined level, and (2) means responsive to the rate of change of said error signal to override said first and said second intermittent control signals when said rate of change is appreciable to provide a third intermittent control signal when the rate of change of said error signal indicates a rising liquid level and to provide a fourth intermittent control signal when said rate of change of said error signal indicates a falling liquid level, said third intermittent control signal being substantially identical to said first intermittent control signal and said fourth intermittent control signal being substantially identical to said first intermittent control signal, and pour rate regulating means responsive to said intermittent control signals to increase the pour rate in response to either said first control signal or said fourth control signal and to decrease the pour rate in response to either said second control signal or said third control signal.

7. In a system for controlling the liquid level of a continuous casting mold, said system including means to provide an error signal having the characteristic that its polarity indicates the direction of liquid level deviation from a predetermned level and its magnitude indicates the extent of deviation of liquid level from said pre-determined level, said system also including a pour rate regulating means for varying the rate of pour of molten liquid into said mold, said pour rate regulating means including a normally closed three position valve having a closed position, a first open position to increase pour rate, and a second open position to decrease pour rate, said system also including a pinch roll drive for withdrawing an ingot from said mold, the improvement comprising:

A. a liquid level control circuit responsive to said error signal to provide appropriate signals to control the position of said valve, said control circuit including:
  (1) means responsive to the polarity of said error signal to provide a first intermittent control signal when said error signal is of one polarity and a second intermittent control signal when said error signal is of the other polarity, said first intermittent control signal being coupled to said valve to switch said valve into said first position and said second intermittent control signal being coupled to said valve to switch said valve into said second position, and
  (2) means responsive to the rate of change of said error signal to override said first and said second intermittent control signals, when said rate of change is appreciable, to provide a third intermittent control signal in response to an error signal change indicating a rising liquid level and to provide a fourth intermittent control signal in response to an error signal change indicating a falling liquid level, said third intermittent control signal being coupled to said valve to switch said valve into said second position and said fourth intermittent control signal being coupled to said valve to switch said valve into said first position, B. a pinch roll speed regulator circuit responsive to said error signal to provide a fifth control signal over said pinch roll drive thereby modifying the withdrawal rate of said ingot, said fifth control signal being a function of the magnitude and polarity of said error signal, said pinch roll speed regulator circuit including:
  (1) means for providing a pre-determined magnitude for said fifth control signal when said error signal is zero,
  (2) means for modifying the magnitude of said fifth control signal in response to the polarity and magnitude of said error signal whereby said fifth control signal is decreased in response to an error signal of one polarity and increased in response to an error signal of the other polarity, the magnitude of said increase or said decrease being proportional to the magnitude of said error signal,
  (3) means for providing a dead band in the response of said fifth control signal to said error signal whereby said modifying means will be disenabled when said error signal has less than a pre-set magnitude in either direction, and
  (4) means for providing a maximum modification in said fifth control signal whereby an error signal greater than a pre-set magnitude in either direction will cease to further modify said fifth control signal.

8. In a system for controlling the liquid level of a continuous casting mold, a liquid level control circuit responsive to a main error signal, said main error signal having the characteristic that its polarity indicates the direction of liquid level deviation from a pre-determined level and its magnitude indicates the extent of liquid level deviation from said pre-determined level, to provide intermittent control signals in response to said error signal, said liquid level control circuit comprising:

a normally "off" dual-output magnetic amplifier having a first output state, a second output state, a first control winding and a second control winding, means for coupling said main error signal to said first control winding whereby a main error signal of a first polarity will tend to force said magnetic amplifier into said first output state and a main error signal of the opposite polarity will tend to force said magnetic amplifier into said second output state, means to provide a derived error signal whose magnitude is a function of the rate of change of said main error signal and whose polarity indicates the direction of the rate of change of said main error signal, means for coupling said derived error signal to said second input control winding, whereby a derived error signal of a first polarity will tend to force said magnetic amplifier into said first output state and a derived error signal of the opposite polarity will tend to force said magnetic amplifier into said second output state, first responsive means coupled to said first output state of said magnetic amplifier to provide a first control signal when energized by said first output state, a second responsive means coupled to said second output state to provide a second control signal when energized by said second output state, and time delay means coupled to said first output state and to said second output state to short out whatever input signal may exist at said first input control winding and at said second input control winding in a pre-determined time after said magnetic amplifier has been forced into either said first output state or said second output state, thereby establishing the intermittent characteristic of said control signals.

9. In a system for controlling the liquid level of a continuous casting mold, a liquid level control circuit responsive to a main error signal, said main error signal having the characteristic that its polarity indicates the direction of liquid level deviation from a pre-determined level and its magnitude indicates the extent of liquid level deviation from said pre-determined level, to provide intermittent control signals in response to said error signal, said liquid level control circuit comprising:

a normally "off" dual-output magnetic amplifier having a first output state, a second output state, a first control winding and a second control winding, means for coupling said main error signal to said first control winding whereby a main error signal of a first polarity, indicating a liquid level above said pre-determined level, will tend to force said magnetic amplifier into said first output state and a main error signal of the opposite polarity, indicating a liquid level below said pre-determined level, will tend to force said magnetic amplifier into said second output state, means to provide a derived error signal whose magnitude is a function of the rate of change of said main error signal and whose polarity indicates the direction of the rate of change of said main error signal, means for coupling said derived error signal to said second input control winding, whereby a derived error signal of a first polarity, indicating a rising liquid level, will tend to force said magnetic amplifier into said first output state and a derived error signal of the opposite polarity, indicating a falling liquid level, will tend to force said magnetic amplifier into said second output state, first responsive means coupled to said first output state of said magnetic amplifier to provide a first control signal when energized by said first output state, second responsive means coupled to said second output state to provide a second control signal when energized by said second output state, and time delay means coupled to said first output state and to said second output state to short out whatever input signal may exist at said first input control winding and at said second input control winding in a pre-determined time after said magnetic amplifier has been forced into either said first output state or said second output state, thereby establishing the intermittent characteristic of said control signals.

10. In a system for controlling the liquid level of a continuous casting mold, a liquid level control circuit responsive to a main error signal, said main error signal having the characteristic that its polarity indicates the direction of liquid level deviation from a pre-determined level and its magnitude indicates the extent of liquid level deviation from said pre-determined level, to provide intermittent control signals in response to said error signal, said liquid level control circuit comprising:

a normally "off" dual-output magnetic amplifier having a first output state, a second output state, a first control winding and a second control winding, means for coupling said main error signal to said first control winding whereby a main error signal of a first polarity, indicating a liquid level above said pre-determined level, will tend to force said magnetic amplifier into said first output state and a main error signal of the opposite polarity, indicating a liquid level below said pre-determined level, will tend to force said magnetic amplifier into said second output state, means to provide a derived error signal whose magnitude is a function of the rate of change of said main error signal and whose polarity indicates the direction of the rate of change of said main error signal, means for coupling said derived error signal to said second input control winding, whereby a derived error signal of a first polarity, indicating a rising liquid level, will tend to force said magnetic amplifier into said first output state and a derived error signal of the opposite polarity, indicating a falling liquid level, will tend to force said magnetic amplifier into said second output state, first relay means coupled to said first output state of said magnetic amplifier to provide a first control signal when energized by said first output state, second relay means coupled to said second output state to provide a second control signal when energized by said second output state, and time delay means coupled to said first relay means and to said second relay means to short out whatever input signal may exist at said first input control winding and at said second input control winding in a pre-determined time after either of said relay means have been energized by said first output state or said second output state, thereby establishing the intermittent characteristic of said control signals.

11. A system for controlling the liquid level in a continuous casting mold comprising:

a liquid level deviation detector circuit coupled to said mold to provide an error signal, said error signal having the characteristic that its polarity indicates the direction of liquid level deviation from a pre-determined level and its magnitude indicates the extent of deviation of the liquid level from said pre-determined level, pinch roll drive means for withdrawing a casting from said mold, and a pinch roll speed regulator circuit responsive to said error signal to provide a control signal for controlling the rate at which said pinch roll drive means withdraws said casting from said mold, said control signal having the characteristics (1) that it remains unchanged in response to an error signal of either polarity that is less than a first preset magnitude, (2) that it changes linearly in amplitude in response to the magnitude of an error signal of either polarity where the error signal is greater than said first preset magnitude and less than a second pre-set magnitude, and (3) that it will cease to further change in response to an error signal having a magnitude that is greater than said second pre-set magnitude.

12. In a system for controlling the liquid level of a continuous casting mold, said system including means to provide an error signal having the characteristic that its polarity indicates the direction of liquid level deviation from a pre-determined level and its magnitude indicates the extent of deviation of liquid level from said pre-determined level, said system also including a pinch roll drive for withdrawing an ingot from said mold, the improvement comprising:

a pinch roll speed regulator circuit responsive to said error signal to provide a control signal over said pinch roll drive thereby modifying the withdrawal rate of said ingot, said control signal being a function of the magnitude and polarity of said error signal, said pinch roll speed regulator circuit including:

means for providing a pre-determined magnitude for said control signal when said error signal is zero, modifying means for modifying the magnitude of said control signal in response to the polarity and magnitude of said error signal whereby said control signal is decreased in response to an error signal of one polarity and increased in response to an error signal of the other polarity, the magnitude of said increase or said decrease being proportional to the magnitude of said error signal, a first pair of biased diodes coupled to said error signal to provide a dead band in the response of said control signal to said error signal by creating biases in either direction in opposition to said error signal so that said error signal is rendered ineffective when the magnitude of said error signal is less than the bias magnitude in either direction, and a second pair of biased diodes coupled to said error signal to provide a maximum limit in the modification of said control signal in either direction by shunting said error signal when said error signal has a magnitude greater than the biased magnitude in either direction.

References Cited by the Examiner

UNITED STATES PATENTS

| 2,394,220 | 2/1946 | Wagner. | |
|---|---|---|---|
| 2,743,492 | 5/1956 | Easton | 22—57.2 X |
| 2,753,605 | 7/1956 | Carleton | 22—85 X |
| 2,772,455 | 12/1956 | Easton et al. | 22—57.2 X |
| 3,204,460 | 9/1965 | Milnes | 22—57.2 X |

FOREIGN PATENTS 697,669   9/1953   Great Britain.

J. SPENCER OVERHOLSER, *Primary Examiner.*

R. S. ANNEAR, *Assistant Examiner.*